United States Patent Office.

DAVID DANIELS, OF FITCHBURG, MASSACHUSETTS.

Letters Patent No. 74,317, dated February 11, 1868.

IMPROVED COMPOUND FOR DESTROYING INSECTS IN TREES.

The Schedule referred to in these Letters Patent and making part of the same.

TO ALL PERSONS TO WHOM THESE PRESENTS SHALL COME:

Be it known that I, DAVID DANIELS, of Fitchburg, in the county of Worcester, and State of Massachusetts, have invented a new and useful Compound Borer-Annihilator, said invention being applicable to fruit and ornamental trees; and I do hereby declare the same to be fully described in the following specification, viz:

The distinctive feature of my invention consists in compounding fish-oil and sulphur, at the rate of one pound of sulphur to one quart of fish-oil, and the same ratio for a greater or less quantity.

A specimen of the above-mentioned compound borer-annihilator is herewith transmitted, marked David Daniels, A.

I claim the compounding of the fish-oil and sulphur substantially as set forth, and the application of the same to the trunks and other parts of fruit and ornamental trees.

DAVID DANIELS.

Witnesses:
   EBENEZER T. LITCH,
   DAVID H. MERRIAM.